US008583473B1

(12) United States Patent
Walcott et al.

(10) Patent No.: US 8,583,473 B1
(45) Date of Patent: Nov. 12, 2013

(54) CONTINUOUS VALUE-PER-CLICK ESTIMATION FOR LOW-VOLUME TERMS

(75) Inventors: Wister Walcott, San Francisco, CA (US); Florian Reichling, San Francisco, CA (US); Joseph L. Barnett, Redwood City, CA (US); Martin S. Betz, Palo Alto, CA (US)

(73) Assignee: Marin Software Incorporated, San Francisco, CA (US)

( * ) Notice: Subject to any disclaimer, the term of this patent is extended or adjusted under 35 U.S.C. 154(b) by 18 days.

(21) Appl. No.: 13/348,575

(22) Filed: Jan. 11, 2012

Related U.S. Application Data

(63) Continuation of application No. 12/170,378, filed on Jul. 9, 2008, now Pat. No. 8,117,066.

(60) Provisional application No. 60/948,670, filed on Jul. 9, 2007.

(51) Int. Cl.
*G06Q 30/02* (2012.01)
(52) U.S. Cl.
USPC .............................................. 705/14; 705/30
(58) Field of Classification Search
USPC ...................................................... 705/10–44
See application file for complete search history.

(56) References Cited

U.S. PATENT DOCUMENTS

| 7,065,500 | B2* | 6/2006 | Singh et al. ................... 705/26.1 |
| 7,860,859 | B2* | 12/2010 | Haugen et al. ................ 707/721 |
| 7,937,405 | B2* | 5/2011 | Anderson et al. ............. 707/770 |
| 7,949,563 | B2* | 5/2011 | Collins ....................... 705/14.43 |
| 2003/0101449 | A1* | 5/2003 | Bentolila et al. ................ 725/10 |
| 2006/0122879 | A1* | 6/2006 | O'Kelley ......................... 705/14 |
| 2006/0149625 | A1* | 7/2006 | Koningstein .................... 705/14 |
| 2008/0120129 | A1* | 5/2008 | Seubert et al. .................... 705/1 |
| 2010/0082429 | A1* | 4/2010 | Samdadiya et al. ........ 705/14.49 |
| 2010/0293057 | A1* | 11/2010 | Haveliwala et al. ....... 705/14.66 |

* cited by examiner

*Primary Examiner* — Frantzy Poinvil
(74) *Attorney, Agent, or Firm* — Fenwick & West LLP

(57) ABSTRACT

An estimated conversion rate for a desired advertisement term is calculated. A total number of conversion events for terms having a conversion rate is determined for each of a plurality of conversion rates, and data is generated that describes a first distribution function representing the conversion rates and the associated numbers of conversion rates. Additionally, data describing a second distribution function representing the probability of a given number of conversion events occurring is also generated. Based at least in part on the first distribution function and the second distribution function, the estimated conversion rate for the desired advertisement term is computed.

20 Claims, 4 Drawing Sheets ly significant amount of information. This may result in imprecise bid calculations for low-volume terms. Given the large number of low-volume terms relative to popular, high-volume terms, it would be beneficial to more accurately compute conversion rates for low-volume terms and thus be able to calculate more accurate term bids.

US 8,583,473 B1

CONTINUOUS VALUE-PER-CLICK ESTIMATION FOR LOW-VOLUME TERMS

CROSS REFERENCE TO RELATED APPLICATIONS

This application is a continuation of U.S. patent application Ser. No. 12/170,378, filed on Jul. 9, 2008, now U.S. Pat. No. 8,117,066 which in turn claims the benefit of Provisional Application No. 60/948,670, filed on Jul. 9, 2007. These applications are incorporated herein by reference.

BACKGROUND

1. Field of Art

The present invention generally relates to the field of sales and advertising, and more specifically, to ways of determining optimal bid amounts for term advertising in an online context.

2. Description of the Related Art

In an online advertising system, advertisers contract with an advertising publisher, such as search engines such as GOOGLE, YAHOO!, or MSN, to run their advertisements. Typically, an advertiser specifies a term, e.g. a keyword or phrase, that is relevant to its advertisements, an amount of money ("bid") that the advertiser is willing to pay if the advertising publisher selects its advertisements for display in association with the term rather than those of another advertiser, and a user clicks on the displayed advertisement or otherwise designates it for further viewing. Bids are generally calculated by the advertiser based on the expected probability of the occurrence of a further desired action ("conversion event") taking place. The conversion event can be, for example, the purchase of a product associated with the advertisement. In response to a user request for information that is associated with the term, the advertising publisher selects an advertisement to display from among the advertisements of all advertisers submitting a bid for that term.

Conversion rates (i.e., the probabilities that a conversion event specified by the advertiser will take place, given that the advertisement is clicked or otherwise designated for viewing), or information such as number of advertisement clicks and the subsequent number of conversions from which conversion rates may be derived, are typically tracked by advertisers. The conversion rates for popular terms (i.e. terms that receive many clicks) are statistically reliable. However, for less-popular terms having little information ("low volume" terms), whatever information there is may be of dubious statistical significance. For example, a term corresponding to a broad product category, e.g. "scooters," would likely have a large amount of information available, e.g. that advertisements about scooters were clicked on 9,352 times, and that conversion actions further took place 877 times, for a conversion rate of approximately 9 percent. In contrast, a term corresponding to a particular product part number within that category, e.g. "RX-1955," might have very little information available, such as that advertisements relating to it were clicked on 2 times, and that conversion events took place 1 time, for a 50 percent conversion rate. However, it is doubtful that the high 50 percent conversion rate is truly representative of the term and would remain at that high rate as the amount of information on the term grows over time. Because any information about low-volume terms is unlikely to be statistically significant, conventional systems for recommending bids for a low-volume term ignore the known conversion rate for that term, instead merely computing a conversion rate that is an average of conversion rates for terms with a statistically significant amount of information. This may result in imprecise bid calculations for low-volume terms. Given the large number of low-volume terms relative to popular, high-volume terms, it would be beneficial to more accurately compute conversion rates for low-volume terms and thus be able to calculate more accurate term bids.

BRIEF SUMMARY

The difficulties described above are addressed by a computer, method, and computer program product that perform statistical operations in order to compute an estimated conversion rate for a desired advertisement term.

One embodiment of the method stores statistics for the folder of related terms, the statistics comprising a number of clicks and a number of conversion events for each of the terms. The method further determines, for each of a plurality of conversion rates, a total number of conversion events for terms having the conversion rate. The method generates data describing a first distribution function that represents a distribution of the total number of conversion events over the plurality of conversion rates, and data describing a second distribution function that represents probabilities of different numbers of conversion events occurring. The method additionally computes and stores the estimated conversion rate for the desired advertisement term based at least in part on the data describing the first distribution function and the data describing the second distribution function.

Embodiments of the computer program product comprise a computer-readable storage medium containing computer program code for storing statistics for the folder of related terms, the statistics comprising a number of clicks and a number of conversion events for each of the terms. The computer program code further determines, for each of a plurality of conversion rates, a total number of conversion events for terms having the conversion rate. The computer program code generates data describing a first distribution function that represents a distribution of the total number of conversion events over the plurality of conversion rates, and data describing a second distribution function that represents probabilities of different numbers of conversion events occurring. The computer program code additionally computes and stores the estimated conversion rate for the desired advertisement term based at least in part on the data describing the first distribution function and the data describing the second distribution function.

A computer adapted to compute an estimated conversion rate for a desired advertisement term comprises a term statistics database comprising storing statistics for the folder of related terms, the statistics comprising a number of clicks and a number of conversion events for each of the terms. The computer further comprises an information analysis module adapted to determine, for each of a plurality of conversion rates, a total number of conversion events for terms having the conversion rate. The information analysis module is further adapted to generate data describing a first distribution function that represents a distribution of the total number of conversion events over the plurality of conversion rates, and data describing a second distribution function that represents probabilities of different numbers of conversion events occurring. The information analysis module is further adapted to compute the estimated conversion rate for the desired advertisement term based at least in part on the data describing the first distribution function and the data describing the second distribution function, and to store the estimated conversion rate.

DETAILED DESCRIPTION

Figure 1:
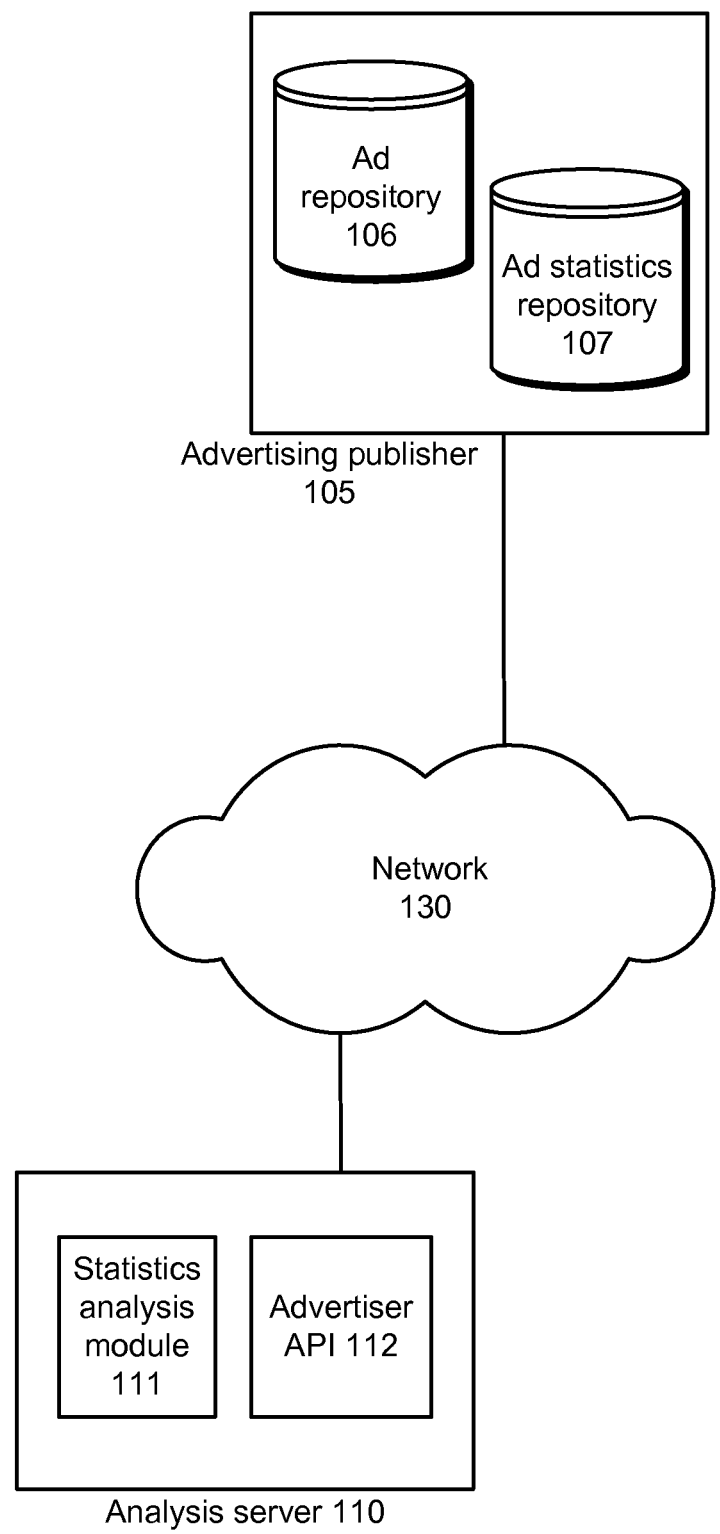
FIG. 1 is a high-level block diagram of a computing environment for online advertising, according to one embodiment.

FIG. 1 is a high-level block diagram of a computing environment for online advertising, according to one embodiment. An advertising publisher 105, e.g. a search engine such as GOOGLE or YAHOO!, provides advertisements related to a given term. The advertising publisher 105 comprises an ad repository 106, which stores advertisements submitted by advertisers in association with the term or terms to which they relate, the bid and statistical information such as the number of times the advertisement was presented and the number of conversion events for the advertisement, and other relevant information.

The advertising publisher 105 selects advertisements to display in response to the triggering of particular terms. For example, in one scenario where the advertising publisher 105 is a search engine, a user might use the advertising publisher 105 to run a query. The query can then be split into a number of terms representing different concepts, with advertisements associated with those terms being selected as candidates for display. Based on the known conversion rates and bids for the advertisements, the advertising publisher 105 can select from the pool of candidate advertisements a set of advertisements generating the highest expected revenues for the advertising publisher 105. The selected advertisements might then be displayed as graphical or textual links with associated textual descriptions located within a sponsored links section of the search results, for example. Activating the links, such as by clicking on them, leads a web browser to display the page designated by the link, such as a page where the associated products can be purchased. Such activation of an advertisement link associated with a particular term is hereinafter referred to as "clicking" the advertisement or its associated term.

In another scenario, the advertising publisher 105 selects advertisements not in response to a query, but in response to the selection of a web page or other electronic content for which the web page owner has contracted with the advertising publisher to provide advertisements. Then, based on terms associated with the content of the web page, the advertising publisher 105 selects advertisements for display on the web page, the selection of the advertisements again being performed so as to maximize expected revenue for the advertising publisher. In this scenario, the selected advertisements might again be displayed as links accompanied by textual descriptions, located adjacent to the main content areas of the web page.

Based on the selecting and providing of the advertisements, the advertising publisher 105 can track advertising statistics related to the advertisements and store the statistics in an ad statistics repository 107. Such statistics can include a number of times that the advertisement was presented (i.e. selected and thus displayed on a web page), a number of times that the presented advertisement was clicked or otherwise designated for further viewing, a number of conversion events that took place based on the advertisement, etc. The advertising publisher 105 further provides an application programming interface (API), e.g. via a web service, by which other systems may obtain the statistics.

An analysis server 110 processes advertising statistics, e.g. those provided by the advertising publisher 105, in order to estimate the optimal amount for an advertiser to bid for a given term. This processing is performed by a statistics analysis module 111, the operations of which include calculating a conversion rate for a given term, and using the calculated conversion rate in conjunction with other values such as the revenue generated by a conversion event to calculate the optimal bid. Such operations are described in more detail below. The analysis server 110 further comprises an advertiser API 112, e.g. a web service or a web-based interface, by which an advertiser can obtain a very precise estimate of the amount to bid, as computed by the statistics analysis module 111.

Figure 2:
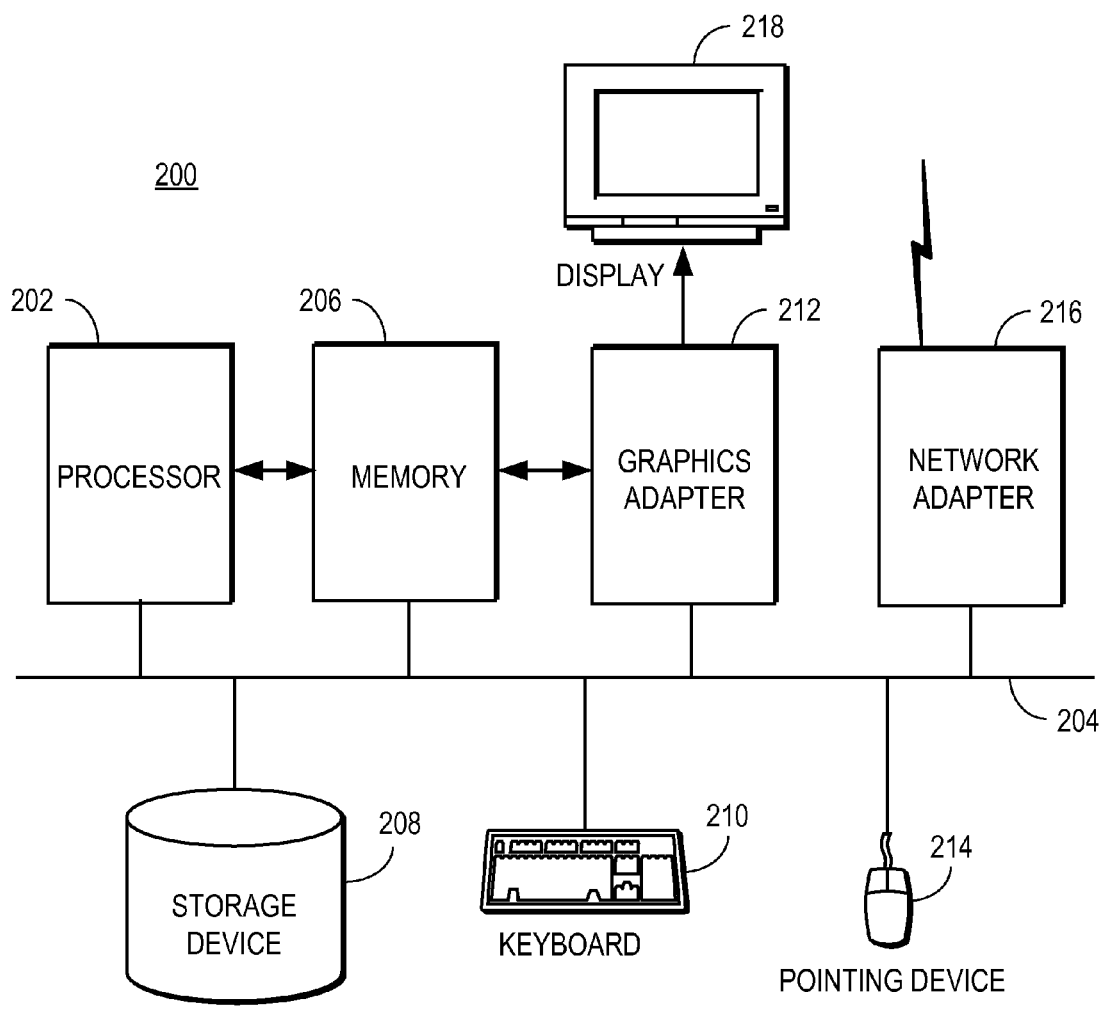
FIG. 2 is a high-level block diagram illustrating a typical computer according to one embodiment.

FIG. 2 is a high-level block diagram illustrating a more detailed view of advertising publisher 105 or the analysis server 110 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

The memory 206 may be, for example, firmware, read-only memory (ROM), non-volatile random access memory (NVRAM), and/or RAM, and holds instructions and data used by the processor 202.

The storage device 208 is, in one embodiment, a hard disk drive but can also be any other device capable of storing data, such as a writeable compact disk (CD) or DVD, a solid-state memory device, or other form of computer-readable storage medium. The storage device 208 stores files and other data structures used by the computer. The web browser 116 and security module 120 are illustrated within the storage device 208.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

Figure 3:
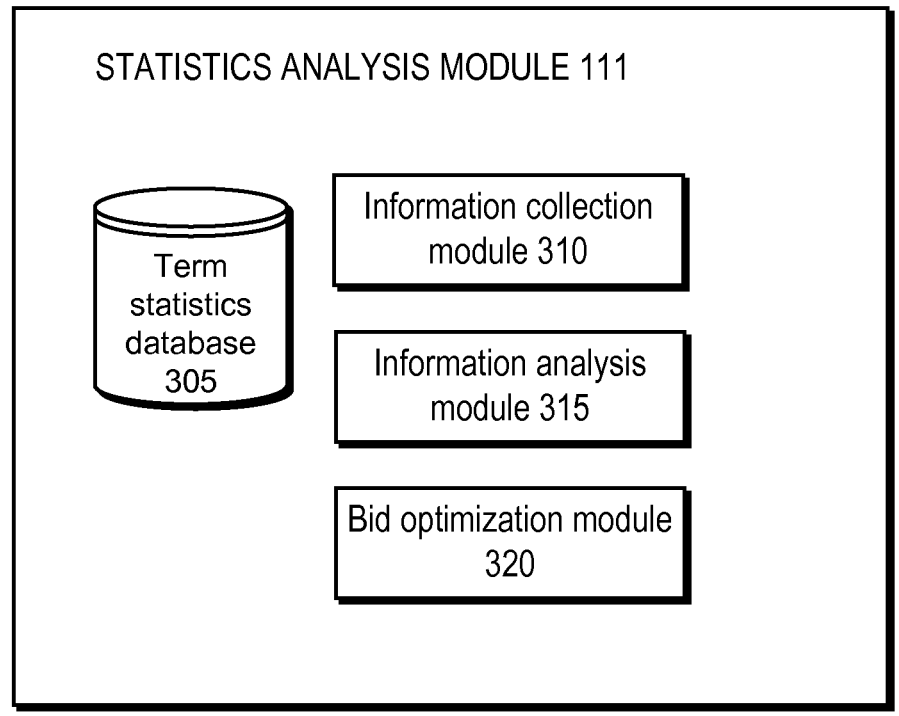
FIG. 3 is a high-level block diagram illustrating a detailed view of the statistics analysis module of FIG. 1, according to one embodiment.

FIG. 3 is a high-level block diagram illustrating a detailed view of the statistics analysis module 111 according to one embodiment. Generally, an embodiment of the statistics analysis module 111 has statistical information related to advertising uses of terms, and processes this information in order to estimate an optimal amount to bid for a given term.

A term statistics database 305 stores the statistical information that is processed in order to arrive at an estimated optimal bid amount for a given term. In one embodiment, these statistics comprise the number of times that a given advertisement was presented for viewing, a number of times that the advertisement was clicked or otherwise designated for further viewing after being presented, and a number of conversion events associated with the advertisement, e.g. purchasing an item based on the advertisement. The term statistics database 305 may be implemented as, for example, a table or tables of a conventional relational database management system.

An information collection module 310 obtains the information stored in the term statistics database 305. In one embodiment, the information collection module 310 obtains the information from the advertising publisher 105 via the API of the advertising publisher 105. For example, in one embodiment the information collection module 310 calls a web service API for the advertising publisher 105 on a periodic basis in order to obtain the most current advertising statistics, updating the term statistics database 305 as appropriate. Attributes of the statistics, such as the particular source of the statistics, may differ in different embodiments. For example, in one embodiment the source of the statistics is a single advertising publisher 105, e.g. a single search engine provider, such as MSN. In another embodiment, the sources may vary, with some statistics being derived from one advertising publisher 105, and others from another advertising publisher 105, and others being a combination of the information available from different advertising publishers 105. The term match type attribute, which is specified by the advertiser and used by the advertising publisher 105 to determine whether or not the term is applicable to the content being viewed (e.g. whether the term must be matched exactly, or whether it may be matched by a semantically related concept), may also vary. For example, in one embodiment, the term match type is the same for all stored statistics. In other embodiments, the term match type is allowed to vary, with the information collection module 310 aggregating statistics having the same term but different match types for that term. Embodiments allowing multiple attributes such as data sources or term match types allow accumulation of a greater amount of statistical information, but may require a mathematical transformation to be applied to the statistics in order to account for the differences in attributes of the statistics for a given term. Such transformation functions may be derived using regression analysis.

An information analysis module 315 processes the information stored in the term statistics database 305, applying statistical techniques to obtain an estimated true conversion rate for a given term—that is, to obtain a statistically-accurate approximation of the true conversion rate for the term based on existing, possibly incomplete information. The estimated conversion rate can then be used to estimate the optimal bid for a given term. In one embodiment, the information analysis module 315 treats high-volume and low-volume terms differently.

In the case of popular, high-volume terms for which there is enough information available to have statistical significance, the information analysis module 315 uses the information for that term to obtain the estimated conversion rate. For example, in one embodiment, the statistics for the given term are examined over a recent time period, such as the past week. If there is a sufficient amount of information available, e.g. 100 click events associated with advertisements for that term, then the conversion rate may be calculated based on the available information alone; if there is insufficient information available, then the information analysis module 315 may examine statistics over a longer time window, until an adequate amount of statistics has been found. If there is still an insufficient amount of information, or if the time period required to obtain a sufficient amount is considered too long, then the term is deemed a low-volume term.

In the case of low-volume terms, additional analysis is performed, including analyzing information relating to an entire "folder" of terms. A folder is a set of terms that represent the same business initiative, e.g. a product line, and that are therefore related to each other. For example, a folder representing the sale of scooters might contain such related terms as "scooter," "scooter red," "scooter blue," "RX-1955," "RX-2008" (assuming that the latter two are model numbers of scooters being sold), and the like. In one embodiment, the terms in the folder are specified by the advertiser. The number of terms in a folder is not fixed, but can vary based on the nature of the business initiative represented by the folder—a small folder might contain five terms, and a large folder hundreds of terms, for example. In one embodiment, the information analysis module 315 performs several additional related operations in order to obtain the estimated conversion rate for low-volume terms, and considers statistics for the entire folder, and not just for the term in question. These operations include determining how many conversion events there were for terms having a given conversion rate, e.g. by generating a histogram for the terms in the folder; generating data representing a first distribution function, such as a beta distribution, for the histogram; generating data representing a second distribution function, such as a binomial distribution, for the histogram; and combining the data representing the first and second distributions. The first, or "prior," probability distribution can be represented by any distribution on the domain 0 to 1 (either parameterized or sampled). An effective distribution balances computational efficiency and a faithful representation of the real-world data. In one embodiment, a user can re-arrange keyword groupings to split a folder into two folders, each of which could be represented by its own beta distribution.

When calculating the estimated conversion rate for a low-volume term, the information analysis module 315 determines, for the various possible conversion rates, the number of conversion events for terms having that conversion rate. In one embodiment, this is accomplished by generating a histogram that maps conversion rates to the number of conversion events for terms in the folder having that conversion rate. In one embodiment, the independent variable values advance in fixed increments, so as to create a finite number of possible data elements. For example, a histogram might be defined for an independent variable ranging from 0 to 1 (representing 0 to 100 percent conversion rates), and have units of 0.001, thereby creating 1001 distinct data elements. This example histogram might have an entry of 3 for the value 0.100, indicating that there are three conversions for terms in the folder having a conversion rate of 10 percent, e.g. 2 conversions for a first term, and 1 conversion for a second term. To generate the values for this histogram, each term in the folder is examined, and the value of the histogram data structure element corresponding to the term's conversion rate is increased by the number of conversion events for that term. For a folder having a relatively modest number of terms, such as 30, and a histogram having sufficiently many distinct elements, the histogram will have many elements with no terms for that given conversion rate.

The information analysis module 315 then generates data describing a first distribution that fits the data points determined above. In one embodiment, the described distribution is a beta distribution function that fits the generated histogram, a beta distribution being described by two parameters, $\alpha$ and $\beta$. The parameters $\alpha$ and $\beta$ can be determined according to the calculations described below.

$$\mu = \frac{\sum \text{conversions}}{\sum \text{clicks}}$$

where μ is the mean conversion rate for the folder, conversions is the number of conversion events for a given term, clicks is the number of clicks on advertisements for the given term, and Σ is the summation operator, with Σx representing the sum of property x for each term in the folder.

The information analysis module 315 calculates an estimate of the variance for the data set given the empirical data in the histogram. In one embodiment, this is accomplished through a maximum-likelihood estimation technique in which a number of potential beta distributions are tried and the beta distribution providing the closest fit is selected. The initial estimate for a beta distribution variance, indicated by the symbol $\sigma^2$, is calculated as follows:

$$\sigma^2 = \frac{\sum (\text{conversions}^2/\text{clicks})}{\sum \text{clicks}} - \mu^2$$

In one embodiment, this estimate of variance may be further refined as follows:

Starting with the initial estimate above, adjust downward, resulting in a tighter variance. In one embodiment, the Newton-Raphson perturbation technique can be used to describe these adjustments.

For each "trial" variance produced by an iteration of the Newton-Raphson technique, calculate the "fit" of the empirical data to the beta function described by the known mean and trial variance. This fit for a given trial is calculated as follows: for each keyword, calculate the probability of that keyword's observations coming from the trial variance; then, sum all the probabilities across all the keywords.

The trial with the highest sum has the highest likelihood of being the correct variance of the underlying distribution.

In another embodiment, the estimated variance may be refined in a particularly computationally-efficient manner by examining a subset of the keywords in the folder which have some greater number of clicks (for example, at least 20 clicks). In yet another embodiment, a fixed variance based on experience can be explicitly selected and scaled to the observed mean.

In this embodiment, the information analysis module 315 does not generate and store all the data values of the beta distribution for each data element, but rather stores only the calculated μ and $\sigma^2$ parameters, calculating a given data value of the beta distribution as a function of those parameters at the time that it is needed. In this embodiment, the μ and $\sigma^2$ parameters completely describe the beta distribution function.

In another embodiment not calculating the parameters of the beta distribution, the data describing the beta distribution is stored in a manner similar to the histogram, i.e., by storing a finite number of data elements, with a fixed incremental value between each, each data element representing a value of the beta distribution function for a given value of its independent variable. For values of the independent variable that fall between histogram points, the value can be interpolated from the known values on either side.

The information analysis module 315 also generates data describing a second distribution that represents the probability of a particular number of conversions occurring for an arbitrary term in the folder, given a particular number of "clicks" on that term. In one embodiment, the second distribution is a binomial distribution for the histogram, the binomial distribution representing the probability p of a given number of events occurring out of n independent events. More particularly, the generated binomial distribution represents the probability of obtaining a given number of conversions for n "clicks" on the advertisement, where the probability of a conversion event given a click is p. The binomial distribution can then be used in conjunction with the beta distribution.

The information analysis module 315 then combines the first and second functions to generate a third distribution function—a "posterior" distribution—that represents the chances of an estimated conversion rate for a term in the given folder. The mean of this function is the expected conversion rate for the term. In one embodiment, generating the posterior distribution involves calculating the products of the values of the beta and binomial distributions at each value of the independent variable. The value of the posterior distribution for a given value x of the independent variable is given by the equation:

posterior(*x*)=beta(*x*)*binomial(*x*)

Thus, for an embodiment in which the beta and binomial distributions produce dependent variable values corresponding to independent variable values ranging from 0 to 1 by increments of 0.001, the product beta(x)*binomial(x) is calculated for each of the 1001 independent variable values from 0 to 1.

When using the beta distribution embodiment, and as a result of the relationship between the beta distribution and the binomial distribution, the estimated conversion rate r for a particular term in the folder is given by the following equation:

$$r = \frac{\mu k + \text{conversions}}{k + \text{clicks}}$$

where conversions is the number of conversions for the given term, clicks is the number of clicks for the given term, and $$k = \frac{\mu - \mu^2}{\sigma^2} - 1$$

With the estimated conversion rate determined, a bid optimization module 320 then estimates an optimal bid for the advertiser to submit to the advertising publisher 105 for a given term. The expected amount of revenue obtained for an advertiser by a given advertisement being "clicked" on is the monetary value of a conversion event, multiplied by the probability of the conversion event occurring. The former is already known to the advertiser; for example, where the conversion event is a sale of a product referenced by the advertisement, the value is e.g. the amount of profit that the advertiser makes from the sale, a value within the advertiser's knowledge. The latter is the estimated conversion rate, as calculated above.

Bidding the full amount of the expected revenue obtained by a conversion event for a given advertisement would cause the advertiser to monetarily break even on the advertisement, since the resulting profit would be equaled by the advertising fee represented by the bid. Thus, the bid optimization module 320 further takes into account a desired profit margin specified by the advertiser. In one embodiment, the bid optimization module 320 estimates an optimal bid for a term as follows:

$$bid_{optimal} = revenue_{expected} * (1 - margin)$$

where $bid_{optional}$ is the optimal bid, $revenue_{expected}$ is the expected revenue from a conversion event, and margin is the desired profit margin, expressed as a real number from 0 to 1.

In one embodiment, the bid optimization module 320 accepts as input from the advertiser a budget amount that the advertiser is willing to pay for a given term and/or other related terms in the folder of terms, thereby enabling bids to be adjusted while still meeting budgetary constraints. In one such embodiment, the bid optimization module 320 adjusts the bid upwards, beyond the estimated optimal bid but limited to the specified budget, to meet any minimum bid requirement specified by the advertising publisher 105. In another embodiment, the bid optimization module 320 may also adjust the bid in order to improve the position that the advertising publisher 105 gives to the advertiser's advertisement within the set of advertisements produced by the advertising publisher 105. Advertising publishers 105 generally give more favorable positions to advertisements that provide greater value—i.e. greater expected revenue—to them. Since the expected revenue of an advertisement to the advertising publisher 105 is a function of the bid for that advertisement and the probability that the action triggering the bid payment will occur, increasing the bid will improve the value of the advertisement to the advertising publisher 105, and thus tend to improve the position given to the advertisement. Excess amounts beyond the cost incurred by paying the estimated optimal bid amount may then be allocated to increase the bid of the term or other terms, thereby securing a more favorable position for their corresponding advertisements.

Figure 4:
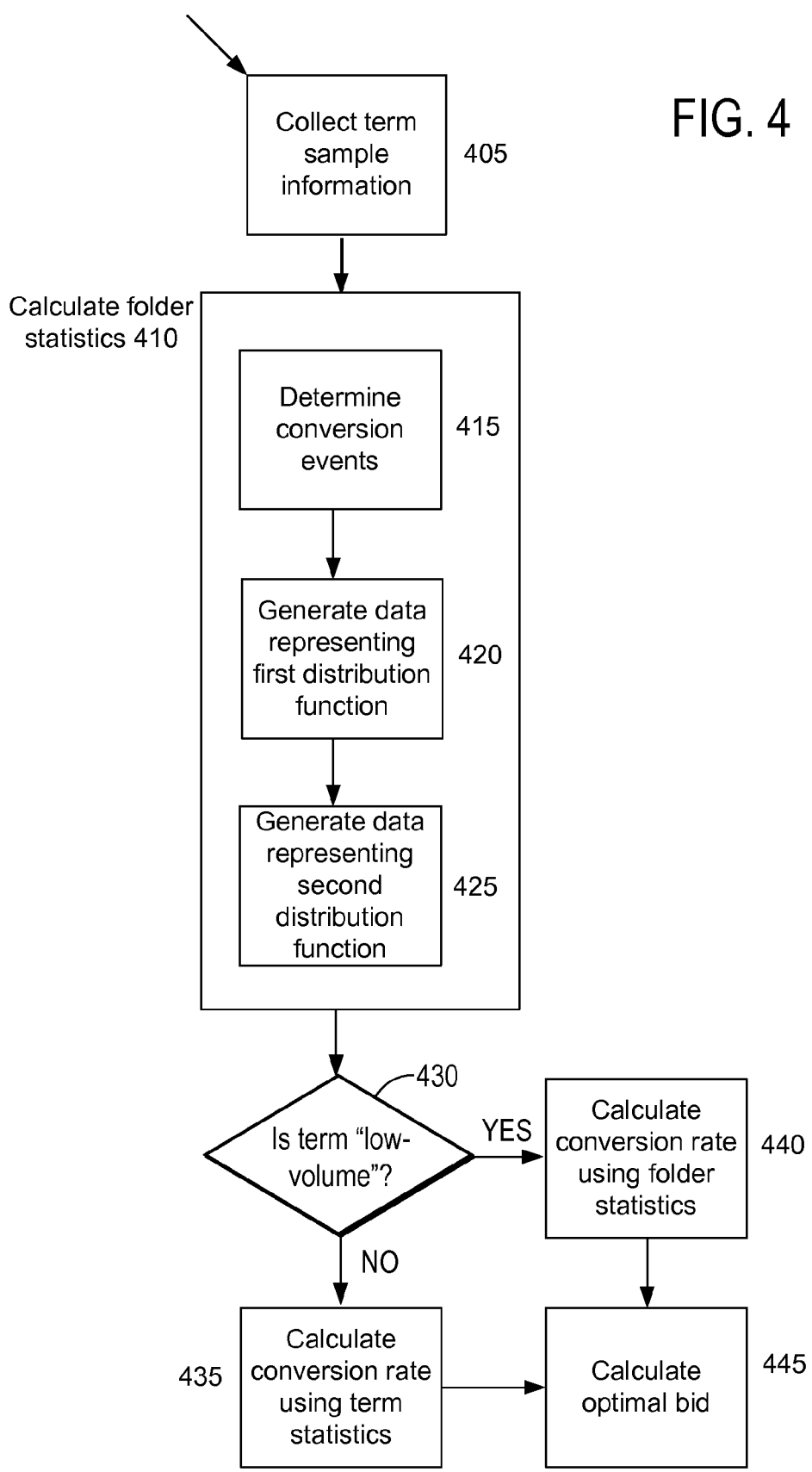
FIG. 4 is a flowchart illustrating steps for calculating an optimal bid, according to one embodiment.

FIG. 4 is a flowchart illustrating steps for estimating an optimal bid for a given term of a folder of terms, according to one embodiment. Initially, the statistics analysis module 111 collects 405 term sample information, such as by obtaining it from an advertising publisher 105, as discussed above. The statistics analysis module 111 then proceeds to calculate 410 statistics for the folder of terms as whole. The statistics analysis module 111 determines 410, for the various possible conversion rates, the number of conversion events for terms having that conversion rate. In one embodiment, this is accomplished by constructing a histogram, as described above with respect to FIG. 3. The statistics analysis module 111 then generates 420 data describing a first distribution function, such as a beta distribution, that fits the data points in step 415. The statistics analysis module 111 also generates data describing a second distribution function, such as a binomial distribution, that represents the probability of a given number of conversions occurring. The statistics analysis module 111 then combines the first and second distribution functions to generate data describing a third function that represents the estimated conversion rate for a term in the given folder.

In one embodiment the statistics analysis module 111 then proceeds to calculate the estimated conversion rate for each term in the folder. In another embodiment, the statistics analysis module 111 calculates estimated conversion rates only on demand. The analysis differs based on whether 430 the term in question is low-volume. If it is not low-volume, then the estimated conversion rate can be calculated 435 by evaluating the statistics—e.g. number of advertisement impressions based on that term, number of clicks, number of conversion events—for that term, without reference to statistics for the folder as a whole. If, however, the term is low-volume, then additional information is used to arrive at an estimated conversion rate, and thus the statistics analysis module 111 calculates 440 the estimated conversion rate with reference to the folder statistics 410, as described in more detail above. This allows a more accurate estimate of the true conversion rate for a low-volume term by incorporating the information available about other related terms in the folder. After the estimated conversion rate is calculated it may be stored, e.g. within the term statistics database 305 or other portion of a durable computer-readable storage medium.

With the estimated conversion rate determined, the statistics analysis module 111 can then estimate the optimal bid. In one embodiment, this involves calculating expected revenue for a conversion event related to an advertisement, factoring in an advertiser-specified profit margin, and adjusting the bid as needed, as described above with respect to the bid optimization module 320.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems. The present invention also relates to an apparatus for performing the operations herein. This apparatus may be specially constructed for the required purposes, or it may comprise a general-purpose computer selectively activated or reconfigured by a computer program executable by a processor and stored on a computer readable medium that can be accessed by the computer. Such a computer program may be stored in a computer readable storage medium, such as, but not limited to, any type of disk including floppy disks, optical disks, CD-ROMs, magnetic-optical disks, flash memory or disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. The computers may communicate over local or wide area networks using wired or wireless network communication protocols.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
    performing, by a computer processor, steps comprising:
        accessing statistics for a set of terms, the statistics comprising a number of viewing designations associated with the terms and a number of conversion events associated with the terms;
        determining, for each conversion rate of a plurality of conversion rates, a number of conversion events for terms having the conversion rate;
        generating data describing a first distribution function that represents a distribution of the conversion events over the plurality of conversion rates;
        generating data describing a second distribution function that represents probabilities of given numbers of conversion events occurring;
        computing an estimated conversion rate for a given term using the data describing the first distribution function and the data describing the second distribution function; and
        storing the estimated conversion rate.

2. The computer-implemented method of claim 1, wherein determining the number of conversion events, generating the data describing the first distribution function, generating the data describing the second distribution function, and computing the estimated conversion rate, are performed responsive at least in part to a given statistic of the statistics for the given term being below a threshold.

3. The computer-implemented method of claim 2, wherein the given statistic is the number of viewing designations for the given term and the threshold is 100 viewing designations.

4. The computer-implemented method of claim 2, the steps further comprising computing the estimated conversion rate based only on the accessed statistics for the given term, responsive at least in part to the given statistic of the statistics for the given term exceeding the threshold.

5. The computer-implemented method of claim 1, wherein the first distribution function is a beta distribution describing a distribution of the conversion events over the plurality of conversion rates.

6. The computer-implemented method of claim 1, wherein the second distribution function is a binomial distribution describing probabilities of given numbers of conversion events occurring for a given number of viewing designations of the given term.

7. The computer-implemented method of claim 1, the steps further comprising:
    computing an estimated optimal bid for an advertiser to submit for an advertisement associated with the term using the computed estimated conversion rate; and
    providing the estimated optimal bid to the advertiser.

8. The computer-implemented method of claim 7, the steps further comprising computing the estimated optimal bid based on a given profit margin.

9. The computer-implemented method of claim 7, the steps further comprising computing an adjusted bid by increasing the estimated optimal bid responsive to at least one of:
    a minimum bid imposed by an advertising publisher to which the adjusted bid is submitted, and
    remaining funds in an advertising budget of the advertiser.

10. The computer-implemented method of claim 1, the steps further comprising obtaining the accessed statistics for the set of terms from an advertising publisher.

11. A computer program product comprising:
    a computer-readable storage medium containing computer program code that when executed by a computer processor performs steps comprising:
        accessing statistics for a set of terms, the statistics comprising a number of viewing designations associated with the terms and a number of conversion events associated with the terms;
        determining, for each conversion rate of a plurality of conversion rates, a number of conversion events for terms having the conversion rate;
        generating data describing a first distribution function that represents a distribution of the conversion events over the plurality of conversion rates;
        generating data describing a second distribution function that represents probabilities of given numbers of conversion events occurring;
        computing an estimated conversion rate for a given term using the data describing the first distribution function and the data describing the second distribution function; and
        storing the estimated conversion rate.

12. The computer program product of claim 11, wherein determining the number of conversion events, generating the data describing the first distribution function, generating the data describing the second distribution function, and computing the estimated conversion rate, are performed responsive at least in part to a given statistic of the statistics for the given term being below a threshold.

13. The computer program product of claim 12, wherein the given statistic is the number of viewing designations for the given term and the threshold is 100 viewing designations.

14. The computer program product of claim 12, the steps performed by the computer program code further comprising computing the estimated conversion rate based only on the accessed statistics for the given term, responsive at least in part to the given statistic of the statistics for the given term exceeding the threshold.

15. The computer program product of claim 11, the steps performed by the computer program code further comprising obtaining the accessed statistics for the set of terms from an advertising publisher.

16. A computer system comprising:
a term statistics database storing statistics for a set of terms, the statistics comprising a number of viewing designations associated with the terms and a number of conversion events associated with the terms; and
an information analysis module executed by a computer processor and configured to:
determine, for each conversion rate of a plurality of conversion rates, a number of conversion events for terms having the conversion rate;
generate data describing a first distribution function that represents a distribution of the conversion events over the plurality of conversion rates;
generate data describing a second distribution function that represents probabilities of given numbers of conversion events occurring; and
compute an estimated conversion rate for a given term using the data describing the first distribution function and the data describing the second distribution function; and
store the estimated conversion rate within the term statistics database.

17. The system of claim 16, wherein the first distribution function is a beta distribution describing a distribution of the conversion events over the plurality of conversion rates.

18. The system of claim 16, wherein the second distribution function is a binomial distribution describing probabilities of given numbers of conversion events occurring for a given number of viewing designations of the given term.

19. The system of claim 16, further comprising a bid optimization module configured to compute an estimated optimal bid for an advertiser to submit for an advertisement associated with the given term using the computed estimated conversion rate.

20. The system of claim 19, wherein the bid optimization module is further configured to compute an adjusted bid by increasing the estimated optimal bid responsive to at least one of:
a minimum bid imposed by an advertising publisher to which the adjusted bid is submitted, and
remaining funds in an advertising budget of the advertiser.

* * * * *